United States Patent [19]

Küsters

[11] Patent Number: 4,856,157
[45] Date of Patent: Aug. 15, 1989

[54] ROLL WITH CONTROLLABLE LINE PRESSURE

[75] Inventor: Karl-Heinz Küsters, Krefeld-Forstwald, Fed. Rep. of Germany

[73] Assignee: Eduard Küsters Maschinenfabrik GmbH & Co. KG, Krefeld, Fed. Rep. of Germany

[21] Appl. No.: 126,773

[22] Filed: Nov. 30, 1987

[30] Foreign Application Priority Data

Nov. 29, 1986 [DE] Fed. Rep. of Germany ....... 3640902
Nov. 29, 1986 [DE] Fed. Rep. of Germany ....... 3640903

[51] Int. Cl.$^4$ .............................................. B21B 13/02
[52] U.S. Cl. ................................... 29/116.2; 29/113.2
[58] Field of Search ................... 29/116.2, 113.1, 113.2

[56] References Cited

U.S. PATENT DOCUMENTS

| | | | |
|---|---|---|---|
| 3,802,044 | 4/1974 | Spillmann et al. | |
| 3,879,827 | 4/1975 | Lehmann. | |
| 4,091,517 | 5/1978 | Lehmann et al. | 29/113.2 |
| 4,307,501 | 12/1981 | Ahrweiler. | |
| 4,598,448 | 7/1986 | Schiel et al. | |
| 4,726,691 | 2/1988 | Lehmann | 29/116.2 |
| 4,751,775 | 6/1988 | Kubik. | |
| 4,776,069 | 10/1988 | Snellman | 29/116.2 |

FOREIGN PATENT DOCUMENTS

| | | |
|---|---|---|
| 2230139 | 1/1973 | Fed. Rep. of Germany. |
| 2332861 | 1/1975 | Fed. Rep. of Germany. |
| 3003395 | 9/1981 | Fed. Rep. of Germany. |
| 3306838 | 8/1984 | Fed. Rep. of Germany. |
| 3528333 | 2/1987 | Fed. Rep. of Germany. |
| 3625802 | 2/1988 | Fed. Rep. of Germany. |

OTHER PUBLICATIONS

Ahrweiler, K. H., "The Vario Swimming Roll Küsters for the Adjustment of Linear Force Distribution", pp. 165-168 (1980).

*Primary Examiner*—Bruce Y. Arnold
*Assistant Examiner*—Jay Patrick Ryan
*Attorney, Agent, or Firm*—Kenyon & Kenyon

[57] ABSTRACT

A roll is provided comprising a rotating hollow roll forming a working circumference and having a stationary crosshead extending therethrough to form a clearance gap therebetween. The entire clearance gap is filled with pressurized fluid. In the crosshead cylinder-like bores are provided with piston-like sealing elements displaceable therein to rest against the inner circumference of the hollow roll. The elements optionally may exert against the inner circumference of the hollow roll a higher or lower pressure relative to the pressure in the gap to create a line pressure or lifting force for shifting the hollow roll in the effective plane.

20 Claims, 5 Drawing Sheets

ROLL WITH CONTROLLABLE LINE PRESSURE

BACKGROUND OF THE INVENTION

The invention relates generally to rolls and more particularly to a hydraulically supported roll having controllable line pressure.

A roll having controllable line pressure is known from DE-P No. 30 03 395. In rolls of this type the annular clearance gap between the crosshead and inner circumference of the hollow roll is subdivided by longitudinal seals arranged along the crosshead on both sides of the effective plane of the roll between crosshead and inner circumference of the hollow roll and past which the inner circumference of the hollow slides. The longitudinal seals divide the annular clearance gap into two semi-circular longitudinal chambers with one longitudinal chamber located on the side of the roll gap and the other longitudinal chamber positioned on the side located opposite the roll gap. The longitudinal chamber on the side of the roll gap can be filled with pressurized fluid and the pressure acting against the inner circumference of the hollow roll generates the line pressure in the roll gap. Zones of decreased pressure are provided in this longitudinal chamber and form irregularities in the otherwise uniform pressure distribution therein through which the line pressure can be modified by controllably reducing the pressure in the zones. Pressurization of only one of the two longitudinal chambers produces the line pressure in the roll gap which may be modified by the decreased pressure zones.

The invention provides an improved hydraulically supported hollow roll by elimination of the complicated and more costly longitudinal chamber-seal arrangement of prior hydraulically supported rolls while still providing for the generation and modification of line pressure in the roll gap.

In DE-No. 30 03 395 in the gap between the crosshead and inner circumference of the hollow roll, the longitudinal chamber located on the side of the roll gap is provided with pressurized fluid which generates a uniform pressure against the inner circumference of the hollow roll and thus a corresponding line pressure since the other longitudinal chamber is not pressurized. However, in the invention, the pressurized fluid in the gap between the crosshead and the inner circumference of the roll does not act solely along one side against the roll gap to generate the line pressure or a portion thereof. Rather, the pressurized fluid acts uniformly in all directions over the entire circumference of the hollow roll since no longitudinal seals have been provided. The effect of this pressure without the additional measures provided by the invention would be neutral and the hollow roll would not be externally affected at all.

SUMMARY OF THE INVENTION

According to the invention, the uniform pressure within the roll clearance gap is created by the elimination of longitudinal seals. Hence, the costs connected with provision of longitudinal seals therefore are avoided, such as the efficiency losses which occur through friction at the longitudinal seals. Even if the roll is provided with longitudinal seals, the uniform pressure throughout can be created artificially through an unrestricted channel connected between the longitudinal chambers divided by the longitudinal seals.

The beneficial effects of the invention is accomplished by providing decreased pressure zones created by provision of piston-like seal elements located in the clearance gap which cause an unsymmetrical fluid pressure. A net force is generated acting on the hollow roll which tends to shift the roll in the effective plane or if the roll is fixed against a counter roll, causes a line pressure in the roll gap.

If, for example, the zones of decreased pressure are provided on the side opposing the roll gap, then the pressurized fluid creates a net force directed against the roll gap thereby leading to creation of a line pressure distribution which was brought about by the seal elements located on the side opposite to the roll gap. The elements create "holes" or "empty spots" in the otherwise uniform pressure distribution, which are opposed on the side of the roll gap by corresponding zones of uniform full pressure thereby creating the net force against the roll gap.

If the zones of decreased pressure are provided on the side of the roll gap, a net force results through the full pressure exerted in the corresponding zones on the opposite side, which tends to separate the hollow roll from the roll gap. This effect can be utilized to influence the line pressure response, if the overall line pressure is generated through external means, for example, by backing rolls which act upon the hollow roll. The force of the backing rolls superimposes itself on the force components resulting from the "holes" or "empty spots" in the pressure distribution. The arrangement also can serve to generate a so-called "inner lift" by which the hollow roll is shifted in the effective plane and the roll gap lifted. This effect is possible in rolls in which the ends of the hollow roll are not fixedly supported by the crosshead in the effective plane, but rather are displaceable radially in this plane with respect to the crosshead.

According to another aspect of the invention, the variation of a generated line pressure can be increased considerably by connection of the seal elements to a source of pressure greater than the pressure in the clearance gap. In this manner, the same seal element may be operated to create zones of little or no pressure or can be operated as an increased or positive pressure element with respect to the pressure in the clearance gap. The seal elements forming the zones thus may be operated as "underpressure" or as "overpressure" elements. With this arrangement, the range of possibilities for varying the line pressure increases considerably. Previously, in order to achieve such a result, pressure elements were required on both upper and lower sides of the crosshead which necessitated corresponding bores in both sides of the crosshead and, consequently, weakened the crosshead. The piston-like seal elements of the invention avoid weakening the structural integrity of the crosshead due to their dual functions as both under-and overpressure elements thereby eliminating the need to form bores in both sides of the cross piece.

Another aspect of the invention lies in that the seal elements of this invention combine the functions of the pressure pieces of DE-OS No. 22 30 139 and the annular sealing elements of DEP No. 30 03 395. Provision of supporting elements hydraulically connected in series functioning only as excess pressure elements and arranged in a longitudinal chamber on one side of a conventional roll is shown in DE-AS No. 23 32 861. The problem results when combining both of these functions because if the seal elements are supposed to function as overpressure elements, a corresponding pressure must exist in the cylinder chamber of the seal element. This requires the element to be sealed against this pressure up to the choke bores such that the requisite pressing against the inner circumference of the roll cylinder can occur. However, if the seal element also is supposed to function as an underpressure element, the pressure of the fluid and the hydrostatic pressure chamber of the seal element must be able to flow to drain. The flow resistance, consequently, must be different in both directions and the invention solves this problem by providing additional return valves in the seal elements.

In one embodiment of the invention, the seal element is provided with choke bores connected with the inner cylinder space of the pistol-like seal element. The pressurized fluid supplied to the cylinder space for operation as an overpressure element, pushes the seal element against the inner circumference of the hollow roll and the pressurized fluid flows from the cylinder space through the choke bores and into the hydrostatic pressure chambers producing the pushing force. For this operational mode to occur, the cylinder space of the seal element only needs to be supplied with positive pressure.

In an alternative seal element embodiment ducts feeding the cylinder space and the hydrostatic chamber are maintained separate. The pressure in the hydrostatic chamber thus does not automatically build but must be regulated externally depending on the pressure in the cylinder space.

Another aspect of the invention which is important for proper operation is the provision of drain chambers at the seal element—inner circumference interface. In both operating modes of the elements, the drain chambers divert the fluid dragged over the edge of the seal element in the region having the higher pressure due to adhesion on the inner circumference of the hollow and prevent the build up of pressure.

If the element functions as an overpressure element and if the pressure in the cylinder space is greater than that in the clearance gap the drain chamber is required to prevent continuous fluid flow from the hydrostatic pressure chamber into the clearance gap. This can give rise to problems especially if the fluid in the gap and the fluid in the cylinder space have different temperatures. Pressurized fluid dragged out due to rotation of the hollow roll generates a colder annular zone at the inner circumference of the hollow roll which can be the cause of undesirable temperature nonuniformities along the hollow roll. This is avoided by provision of the aforementioned drain chamber.

On the other hand, if the pressure in the clearance gap is higher than that in the cylinder space, fluid is dragged from the cylinder space into the hydrostatic pressure chamber and can cause a pressure build up therein which can hamper the intended underpressure function. Through the provision of a drain chamber, the fluid dragged in over the edge of the element is diverted before it can build up pressure.

A projection at the edge of the seal element is necessary in some embodiments for proper functioning of the element as an overpressure element, i.e., the supporting cross sectional area of the hydrostatic pressure chamber must be greater than the cross sectional area of the cylinder bore in order to create a thin protective fluid film between the inner circumference and seal element. This can be accomplished only if the effective area of the supporting face of the element resting against the inner circumference of the hollow roll is greater than the effective area of the element's piston-like under portion. However, when the element is operated as an underpressure element, then the higher pressure in the clearance gap acts on the under side of the projection to force the stamp against the inner circumference of the hollow roll. Given the relatively high pressure in the gap, this force can prevent the formation of the protective film. This problem is solved by a return valve which during operation as an underpressure element relieves the high pressure in the gap into the inner chamber of the element and the choke bores to the hydrostatic pressure chamber. Consequently, the pressure builds up in the pressure chamber creating a force that opposes that acting on the projection.

Additionally, the cylinder space may be connected via additional choke bores with the drain chamber. In this manner during operation as an overpressure element, the effective cross sectional area of the drain chamber also can be utilized for exerting hydrostatic pressure. The hydrostatic pressure chamber may form an island-like portion in the interior of the drain chamber. The effective cross sectional area of the pressure chamber can be adjusted relative to the effective cross section of the projection such that the force acting to push the element away from the inner circumference of the roll shell does not increase too much. Nevertheless, for operation as an overpressure element a large effective cross section is available due to the combination of the effective cross sections of the actual hydrostatic pressure chamber and the drain chamber.

According to another aspect of the invention, all of the seal elements may be positioned on one side of the crosshead, namely on the side of the roll gap. The advantage in this arrangement is that the hollow roll can be pulled away from the roll gap as well as forced against it. In this manner, a roll may be provided with inner lift, i.e., the roll can be lifted even, for example, if the roll gap is below the roll and lifting must occur against the Weight of the hollow roll. A line pressure also can be exerted.

The variety of ways of exerting pressure can be increased further by provision of additional zones of increased pressure which, for example, may be formed as pressure elements shown in DE-OS No. 22 30 139.

The invention is not only directed to a hydraulically supported roll as previously described in which no longitudinal seals are required, but also to an improved piston-like sealing element combining the dual functions previously discussed and suitable for use in all types of hydraulically supported rolls.

DETAILED DESCRIPTION

Figure 1:
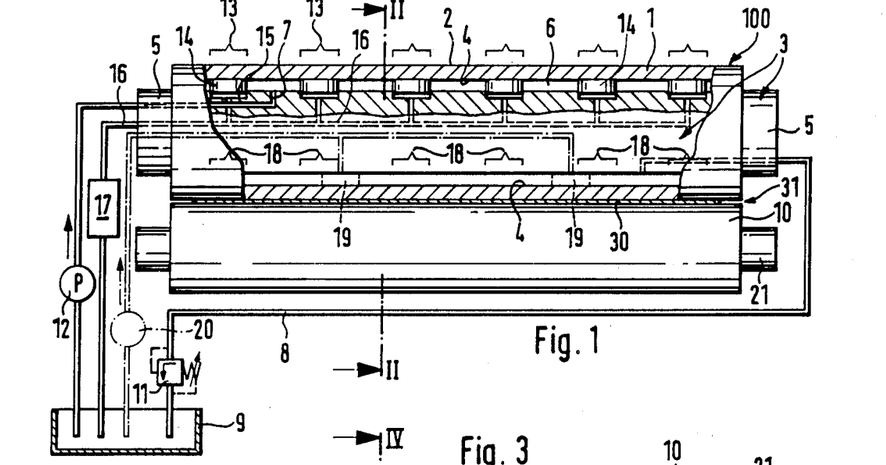
FIG. 1 is a schematic view, partly in section showing a roll pair, in which the upper roll is constructed according to the invention with zones of decreased pressure with respect to the pressure in clearance gap between the crosshead and hollow roll.
Figures 2, 3, 4:
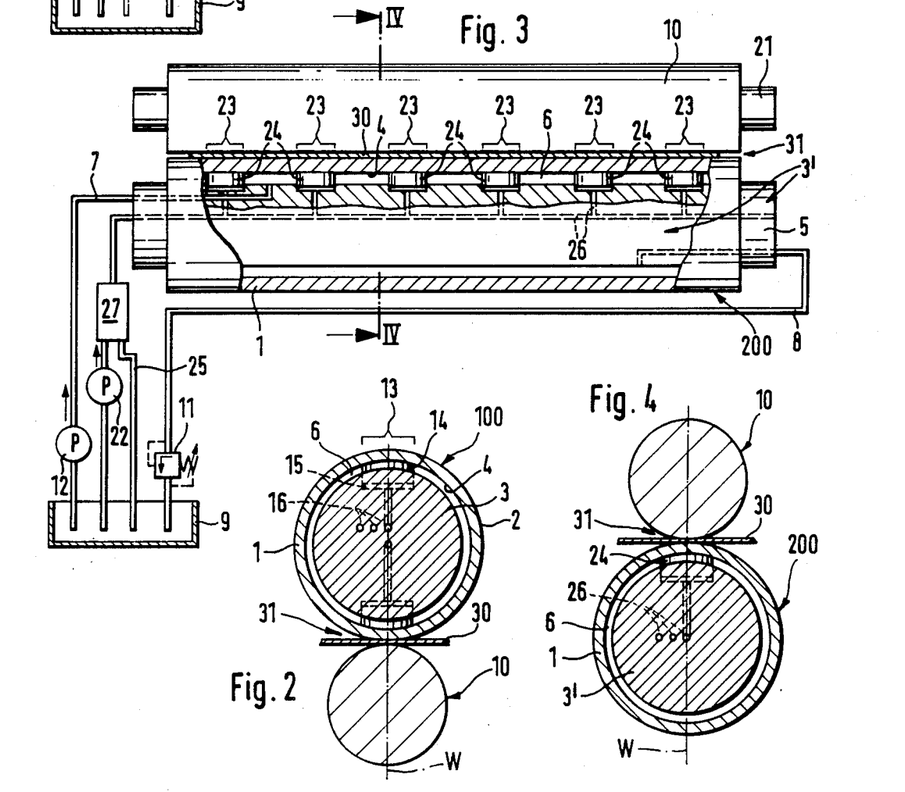
FIG. 2 is a cross sectional view along line II—II in FIG. 1 showing the roll pair on a slightly increased scale.
FIG. 3 is a view corresponding to FIG. 1 showing another roll pair in which the lower roll is equipped with piston-like sealing elements which can operate as underpressure elements as well as overpressure elements.
FIG. 4 is as cross sectional view along line IV—IV of the roll pair shown in FIG. 3.

The roll arrangement shown in FIGS. 1 and 2, comprises a lower roll 10 and an upper roll 100, forming a roll gap 31 therebetween in which a web of material, such as fabric panel 30, is squeezed for pressure treatment of the web. The lower roll 10 may be a conventional solid roll. The upper roll 100, on the other hand, comprises a rotating hollow cylinder or roll 1, the outer surface 2 of which forms the working roll circumference. Extending through hollow roll 1 is a stationary crosshead 3, which along with inner circumference 4 forms an annular clearance gap such that crosshead 4 can bend within the roll 1 as external forces are applied to the roll ends without the crosshead coming in contact with the inner circumference 4.

The pins 21 of the lower roll 10, as well as the ends of the cross head 3 projecting from the ends of hollow roll 1, are guidably supported in a roll stand (not shown) and may be connected to each other by suitable load devices.

The hollow roll 1 may be rotatably supported at its ends on crosshead 3 by bearings not shown in FIGS. 1 and 2. Alternatively, the hollow roll 1 may be guided on the crosshead 3 in the effective plane W, i.e., in the plane connecting the axes of the two rolls 10 and 100, and the hollow roll can shift in this plane relative to the crosshead 3.

The clearance gap 6 between the crosshead 3 and the inner circumference 4 of the roll 1 is sealed off at the ends by transverse end seals and may be filled with pressurized fluid for supporting roll 1 via an inlet line 7. The pressurized fluid can be fed back into the return tank 9 through outlet line 8. In line 8 a pressure limiting valve 11 is arranged, which remains closed until a predetermined pressure is attained thereby maintaining a predetermined pressure in the gap 6. A flow current in the longitudinal direction of the gap results as fluid flows from inlet 7 at the left end of roll into gap 6 and exits at outlet line 8 at the right end of the roll thereby creating a uniform roll gap temperature when the pressure fluid serves simultaneously for supporting the roll and controlling its temperature. The fluid fed to tank 9 is pressurized and recirculated by a pump 12 connected to the inlet duct 7.

The pressure is uniformly distributed throughout annular clearance gap 6 because of the absence of any longitudional seals or partitions in gap 6. Without additional measures the fluid in gap 6 would not exert any net force on the roll cylinder 1, due to equal and opposite pressures exerted by the fluid in gap 6 against the equal and oppositely positioned surfaces within annular gap 6. Since the roll cylinder 1 is supported only by the pressure in the gap 6 and is not affected noticeably by outside influences, this uniform pressure distribution would prevent the creation of line pressure or the shifting of cylinder 7 in the effective plane W.

However, according to the invention, in the roll 1 on the side away from the roll gap, pressure zones 13 are formed which are devoid of the pressure existing in the interspace 6. In this manner, shifting of the roll cylinder 1 in the effective plane W may be controlled along with the line pressure caused thereby in roll gap 31. The longitudinal extent of the zones 13 is indicated by the small parentheses. In the embodiment of FIGS. 1 and 2, six such zones are present, however, the number of zones actually provided may be selected based upon the pressure effect desired.

Zones 13 are formed by annular piston-like seal elements 14, which are slidable in cylindrical pocket bores 15 formed on the upper side of the crosshead 3 and bear against the mating surface of the inner circumference 4 of the roll cylinder 1, thereby sealing the zones from the pressure in gap 6. Each of the pocket bores 15 is connected via a respective line to one or more feed ducts 16 which are connected to a control device or valve 17 which operates to maintain a predetermined pressure in the interior of the annular sealing elements 14 and thus in the zones 13. The predetermined pressure within zones 13 may be lower than the pressure in the gap 6 and may be controlled individually or in groups depending on the number of valves and feed ducts 16 provided. In the simplest case the control device 17 may directly connect all of the zones 13 with the store tank 9 so that the zones 13 are practically pressureless.

In this manner "holes" or "empty spots" are left in the otherwise uniform pressure in gap 6 by reduced pressure zones 13. This causes a non-uniform pressure exertion of the fluid in the gap 6 since there is less effective area above the horizontal center plane of the roll 1 than below it, upon which pressure in gap 6 can act. Zones 13 are, with respect to the meridian or horizontal center plane of roll 100 (longitudinal center plane perpendicular to plane W) opposed by imaginary zones 18 in which the full gap pressure of the fluid is exerted. Since zones 18 are opposed above the meridan plane by zones 13, in which no or only a reduced pressure exists, the overall effect of the presence of zones 13 is to create a net force. This force may be represented by the area of the zones 18 multiplied by the pressure in the gap 6 when zones 13 are effectively pressureless. This force acts in a direction, which according to FIG. 1, tends to displace the roll cylinder 1 downardly with respect to the stationary crosshead 3 and thereby reduce the roll gap 31. Therefore, arrangement of the annular sealing elements 14 in roll 100 on the upper side of crosshead 3 produces a net force in the downward direction shown in FIG. 1.

In FIG. 1 two or more additional piston-like sealing elements 19 may be provided which are arranged on the underside of the crosshead 3 to exert a positive force against the underside of the inner circumference 4 of the roll cylinder 1. Elements 19 are fed with pressurized fluid by pump 20. Alternatively, the pressure for supplying the elements 19 may be derived from pump 12. Since the pressure elements 19 are not required, but are merely additional elements which act in conjunction with the line pressure distribution caused by the zones 13, they are shown along with their feed ducts and pump 20 by dash-dot lines. The line pressure exerted by roll 100 may be adjusted by appropriate control of the pressure presented to elements 19.

In FIGS. 3 and 4, another embodiment of the invention is shown. The reference numerals used to describe parts corresponding to those previously discussed in connection with FIGS. 1–2 remain the same. In the roll arrangement of FIGS. 3 and 4 a lower roll 200 is provided which, like the upper roll 100 shown in FIGS. 1–2 comprises a roll cylinder 1 rotating around a stationary crosshead 3′. The roll 200 works against an upper roll 10 and exerts pressure on the web in the roll gap. The annular gap 6 between the inner circumference 4 of the roll cylinder 1 and the crosshead 3′ in roll 200 can be filled with fluid under a variable pressure via an inlet duct 7 and outlet line 8. However, in this embodiment, the elements 24, which interrupt the otherwise uniform pressure distribution to generate line pressure, are arranged on the same side as the roll gap 31. Piston-like elements 24 of roll 200 differ from the elements 14 of FIG. 1 and 2, only in that with the elements 24 it is possible to provide via feed ducts 26 an increased or decreased pressure in zones 23 with respect to the pressure in gap 6. The valve or control device 27 permits the interior of elements 24 to be optionally connected via line 25 with the return tank 9 such that no appreciable pressure builds within zones 23 or with pump 22 such that the pressure in zones 23 is increased compared to the pressure in the gap 6.

In this manner, elements 24 may perform two functions. First, if a lower pressure in presented in zones 23 than in gap 6, the force generated in the gap 6 in the opposing zones (not shown in FIG. 3) is greater than that in zones 23 and a force results which tends to pull the roll cylinder 1 away from the counter roll 10. Thus, if the roll cylinder 1 is not fixedly supported at the ends but can be shifted relative to crosshead 3′ in the action plane W, movement of the roll cylinder 1 away from the roll gap 31 can occur when the abovementioned force results. This may be desirable, for example, in order to thread the fabric web 30 in gap 31. In this mode of operation the elements 24 function as "underpressure elements". The second function occurs when a pressure is generated in zones 23 which is greater than that present in the gap 6. In this mode of operation elements 24 function as "overpressure elements" i.e., they generate a net force upwardly directed tending to decrease the roll gap 31 and increase the line pressure.

Embodiments of elements 24 (shown only schematically in FIGS. 3 and 4) which can function as underpressure elements and overpressure elements are set forth in FIG. 5 to 15. For descriptive purposes, the elements described are discussed in connection with the roll 200. However, it is understood that the elements may likewise be provided in roll 100 or other suitable hollow rolls.

Figures 5, 6, 7, 8, 9:
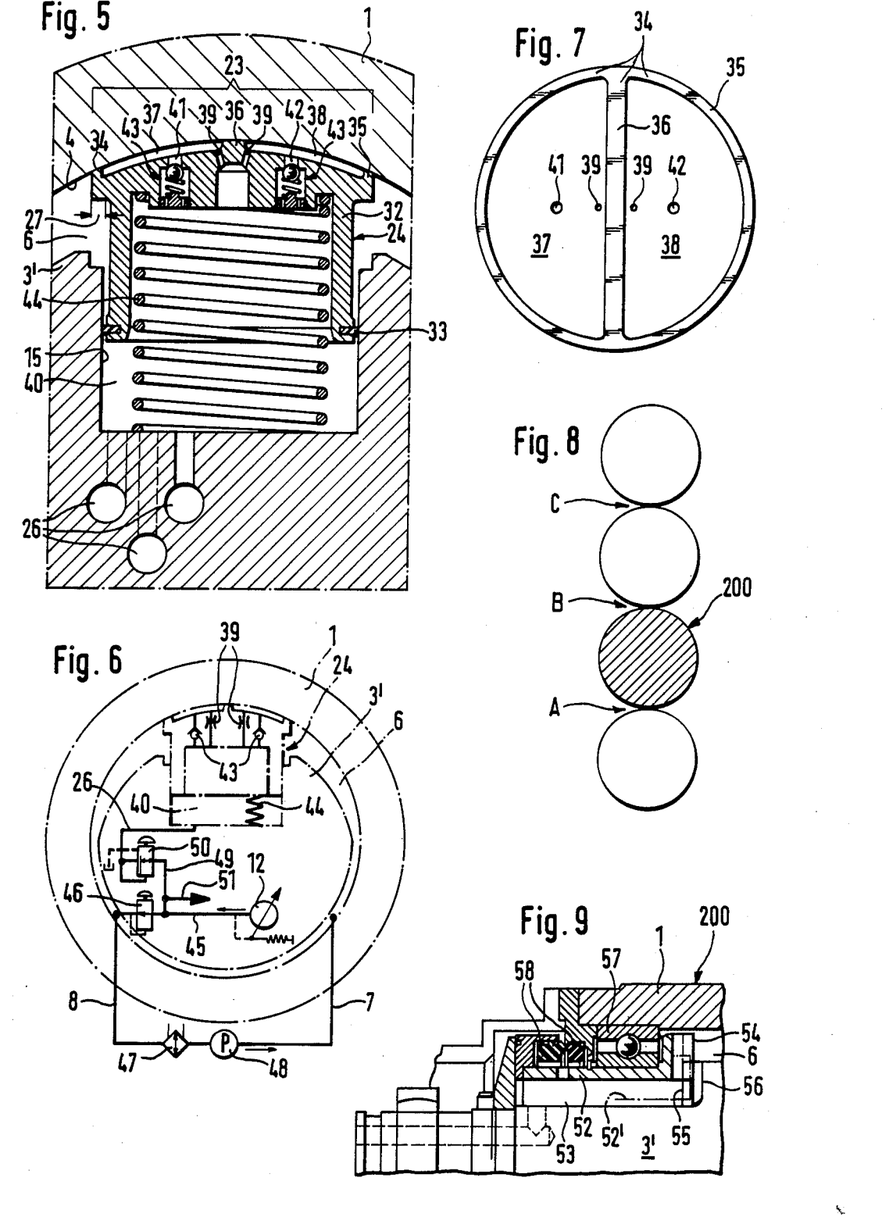
FIG. 5 is an enlarged partial section through a roll constructed according to the invention showing one embodiment of a sealing element.
FIG. 6 is a cross sectional view corresponding to FIG. 5 but of decreased scale, in which the hydraulic circuitry of the roll of FIG. 5 is schematically shown.
FIG. 7 is a top view of the sealing element in FIG. 5.
FIG. 8 is a schematic view of a stack of calender rolls in which the roll constructed according to the invention is cross-hatched.
FIG. 9 is a partial longitudinal sectional view through one end of a roll provided with inner lift according to the principles of the invention.

In FIGS. 5 to 7 a simple element 24 is shown which comprises a cup-shaped piston-like cast part 32 which may be formed from a suitable bronze material. Part 32 is inserted with its open side facing down into the pocket bore 15 and is, similar to a piston, movable in the bore. Sealing is accomplished by an annular seal ring 33 arranged at the lower edge of the part 32 to seal cylinder space 40. At the top of part 32 a supporting area 34 is formed, the shape of which conforms to the inner circumference 4 of the roll cylinder 1. Area 34 bears against the inner circumference 4 of the roll cylinder 1 as shown in FIGS. 5, 6, 10, 11, 13 and 14.

The support area 34 comprises a closed annular web-like edge 35 projecting against the inner circumference 4 of the roll cylinder 1 and a connecting web 36 lying in the effective plane W. Edge 35 and the connecting web 36 form the boundaries of two hydrostatic pressure chambers 37, 38, each of which is in the form of a flat depression adjacent to the inner circumference 4 of roll cylinder 1 in the vicinity of the support area 34. The edge 35 may have an outer diameter of approximately 180 to 200 mm and the hydrostatic pressure chambers may be 6 to 8 mm deep. The cylinder space 40 formed in the interior of the pocket bore 15 below the element 24 is connected through two choke bores 39 with the hydrostatic pressure chambers 37 and 38. In addition, part 32 is formed with channels 41, 42 which are connected between the hydrostatic pressure chambers 37, 38, respectively, and the cylinder space. In each channel 41, 42 return valves 43 are arranged. Valves 43 are formed as ball check valves and may open to permit flow only in the direction toward the cylinder space 40 and prevent flow in the opposite direction.

As is evident in FIG. 5, three feed ducts 26 are provided in crosshead 3′, with the right-most one being connected to cylinder space 40. The other feed ducts are respectively connected to the space 40 of adjacent elements 24. In such a case, for example, six elements 24 may be supplied with three feed ducts 26, as shown in the embodiment of FIG. 3. It is understood, that a different number of elements and feed ducts can be present depending upon the operating conditions required. If the number of elements is even and the operating conditions only require the exertion of line pressure symmetrically distributed with respect to the center, it is sufficient to provide two elements for each feed duct to produce a line pressure, which although variable over the width of the web is symmetrical with respect to the web center. However, if operating conditions require independent controllability for each element, a separate feed duct may be provided for each element 24.

Element 24 is biased by a compression spring 44, which rests against the bottom of the pocket bore 15 and against the part 32, to continuously, i.e. even without the presence of fluid pressure, bear against the inner circumference of roll cylinder 1. In the presence of fluid pressure in the gap 6, additional pressure, generated by fluid acting on the overhanging portion 27 of the head of element 24, is exerted against circumference 4. The overhanging portion 27 is provided when the pressure chambers 37, 38 must have at least the same effective cross sectional area as the pocket bore 15, as subsequently discussed.

If element 24 is intended to work as an overpressure element via its particular feed duct 26, fluid is supplied to element 24 at a pressure which is higher than the pressure in the gap 6. The cylinder space 40 first fills up with fluid at which time the fluid reaches via the choke bores 39, the hydrostatic pressure chambers 37, 38 until these chambers are filled also. The effective cross sectional area of the hydrostatic pressure chambers 37 and 38 is slightly larger than the effective cross sectional area acted upon by the pressure in the cylinder chamber 40, i.e., the cross sectional area of the pocket bore 15.

This permits the pressurized fluid in the hydrostatic pressure chambers 37, 38 to push element 24 away from the inner circumference 4 of the roll cylinder 1 by a short distance to form a small clearance therewith. Pressurized fluid than flows over the edge 35 into the gap 6. This fluid loss causes the pressure in the hydrostatic pressure chambers 37, 38 to decrease practically instantaneously. As a consequence, the clearance gap created at edge 35 closes until the pressure in the hydrostatic pressure chambers 37, 38 increases again due to fluid supply from choke bores 39. In this manner, an equilibrium is reached in which the edge 35 and the connecting web 36 continuously are prevented from coming into contact with the metallic inner circumference 4 of the roll cylinder 1 by formation of a thin protective fluid layer formed there-between.

Two hydrostatic pressure chambers 37, 38 may be provided so element 24 can be better stabilized and the supporting fluid layer be more uniform at the inner circumference 4 of the roll cylinder 1.

In the other operating mode, i.e., when the element 24 functions as underpressure element, the particular feed duct 26 may be, for example, directly connected with the return tank. The cylinder space 40 then becomes practically pressure-less. Element 24, nevertheless, is held in contact with the inner circumference 4 via spring 44, even if no pressure exists in the gap 6. However, if such pressure has been built up, through the rotation of the roll shell 1 and the adhesion of the pressurized fluid at the inner circumference 4, fluid from the gap 6 may be dragged over edge 35 into the hydrostatic pressure chambers 37, 38. This would normally lead to filling of these chambers and a building of hydrostatic pressure therein. In order to prevent this pressure build-up, return valves 43 are provided which open when pressure in the chambers 37, 38 reaches a predetermined value to allow the pressure fluid in the chambers to flow into the cylinder space 40. Hence, the desired "underpressure" condition i.e., a pressure below that present in the gap 6, is assured in zone 23.

Provision of return valves 43 is required for elements 24 to carry out the dual functions as both under-and overpressure elements. These valves block the fluid passages to enable the elements to function as overpressure elements, but do not permit fluid pressure to build to an appreciable valve to hamper performance when functioning as an underpressure element.

In FIG. 6 a hydraulic circuitry diagram for the roll is shown. Pump 12 generates fluid pressure of a value between 60 and 80 bar, which via line 45 flows to the reducing valve 46, which reduces the pressure to a value of approximately 30 bar intended for the gap 6. The pressurized fluid is fed into gap 6 from where it may flow through outlet line 8 to a heat exchanger 47, where if necessary, the fluid is heated or cooled, and then to circulating pump 48 and line 7 which again leads into gap 6. The circulating pump 48 is not required to generate large pressure differences, but rather only functions to provide for the flow of fluid through gap 6.

Via line 49 the pressurized fluid delivered by the pressure pump 12 flows to a three-way pressure regulator 50 into line 26 and into the cylinder space 40 where it flows in the previously described manner through the choke bores 39 of element 24. The arrow 51 symbolizes the lines to the additional cylinder spaces 40 of other elements 24. There may be a pressure regulator 50 connected to each space 40 enabling the pressure of each element to be individually regulated.

In FIG. 3, roll 200 is shown in an arrangement cooperating with only one counter roll 10. FIG. 8 schematically illustrates the use of roll 200 in a calender stack having four rolls. In this manner, the selective control of the pressure from one region in which the roll 200 presses upwardly to a region in which it acts downwardly, by constructing roll 200 according to the invention, can be employed to adjust the distribution or sequence of line pressure in the roll gaps A, B and C arranged above each other.

As previously mentioned, roll 200 may be provided with "inner lift", i.e., the roll cylinder 1 instead of being fixedly supported on the ends of crosshead 3', is slidable in the effective plane relative to the crosshead 3'. In FIG. 9 one such arrangement providing the aforementioned relative motion of the roll 1 is illustrated. In FIG. 9, cylinder 1 is displaceable upwardly and downwardly with respect to crosshead 3'. Guidable support of the roll cylinder 1 for rotation and movement in the effective plane is accomplished by a guide ring 52, which surrounds the end region of crosshead 3' with radial play 53. On the right end of ring 52, a bifurcated guide piece 54 is located having legs which surround a radial guide web 55 fastened from both sides on a shoulder 56 of the crosshead 3'. The guide ring 52 can shift in the effective plane from the position represented with solid lines, for example, into position 52' indicated with dot-dashed lines. The arrangement of FIG. 9 prevents a relative position shift perpendicular to the effective plane. The roll cylinder 1 is rotatably supported on the guide ring 52 by a bearing 57, which is not intended for force transmission in the effective plane. In the gap 6 between roll cylinder 1 and crosshead 3' on the right hand side of FIG. 9, elements 24 are provided as previously discussed. Sealing of the gap 6 is accomplished by a transverse end seal ring 58 provided on both ends of roll 200 although only one such ring 58 is visible in FIG. 9. The roll cylinder 1 may be downwardly displaced relative to the 3', stationary crosshead or upwardly displaced due to the dual functions of the elements 24 as under-or overpressure elements. This is advantageously accomplished by use of elements 24 arranged only on one side of the crosshead thereby only weakening the integrity of on one side of the cross head.

Figure 10:
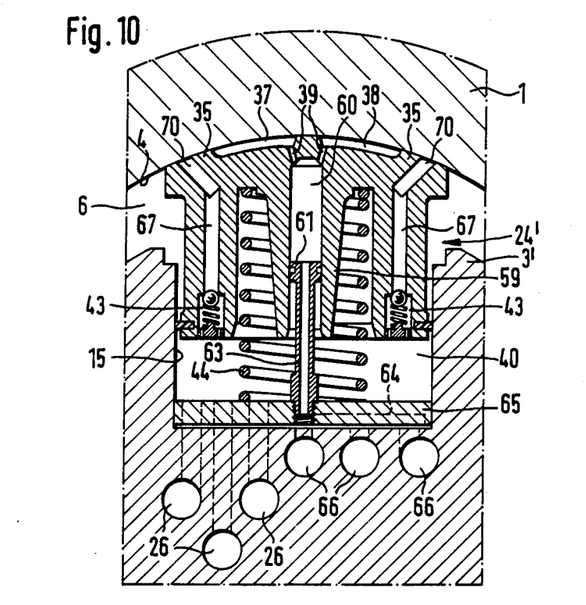
FIGS. 10, 11, and 12 are views corresponding to FIGS. 5, 6, and 7, respectively, of another embodiment of a sealing element constructed according to the invention.
Figures 11, 12:
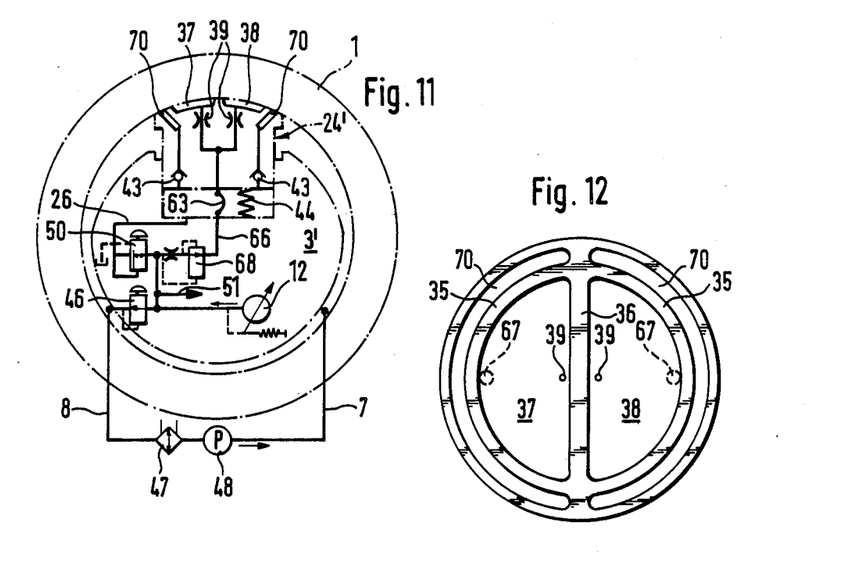

Another embodiment of element 24 is depicted at 24' in FIGS. 10–12. Element 24' differs from element 24 in several respects. First of all, choke bores 39 do not terminate in the cylinder space 40, but rather lead to an inner chamber 60 of element 24', which is formed as a cylindrical bore in the center of downwardly depending projection 59. Bore 60 contains a sleeve 63 having a piston-like upper end part 61 which guidably supports bore 60 for longitudinally displacement of element 24'. The lower end of sleeve 63 is screwed into a distributor plate 65 arranged in the bottom of the pocket bore 15. Plate 65 is provided with radial channels 64 through which the interior of the sleeve 63 is connected by feed lines 66. The inner chamber 60 may be fed with fluid pressure from any of the feed ducts 66 which are separate from ducts 66 and the fluid pressure in the cylinder chamber 40. Provision of parts 61, 63 and 64 forms a line pressurization arrangement operable in any position of 24' relative to the pocket bore 15.

This feature enables the fluid pressure supplied to hydrostatic pressure chambers 37, 38 to be independent of the pressure in the cylinder chamber 40. Therefore, the effective area of the cylinder chambers 37, 38 need not be larger than the part of element 24' slidable in the pocket bore 15 for creation of the thin film between circumference 4 and element 24'. Via feed ducts 66 the hydrostatic chambers 37, 38 receive a controlled quantity of fluid pressure independent from feed ducts 26. This fluid volume supplied remains constant over time and flows off over edge 35 to ensure provision of the thin supporting fluid layer between the contact surface 34 and the inner circumference 4 of the roll cylinder 1. The pressure in the hydrostatic chambers 37, 38 may be fed automatically and no particular ratio to the pressure in the cylinder chamber 40 is required.

Another difference in this embodiment of the element is provision of drain chamber 70 which lies outside the edge 35 of the hydrostatic pressure chambers 37, 38. Drain chamber 70 is connected to a channel 67 containing a return valve 43 connected with the cylinder chamber 40. As can be clearly seen in FIG. 12 the two drain chambers 70 are semicircular in shape and are provided outside of the edge 35. The purpose of the drain chambers 70 is to catch the fluid flowing over the edge 35 and return it to the cylinder space 40 when, for instance, the element 24' functions as underpressure element, i.e. when the pressure in the gap 6 is greater than the pressure in the hydrostatic chambers 37, 38. Under those circumstances, quite a bit of pressurized fluid is dragged along at the inner circumference 4 of the roll cylinder 1 as previously discussed. Without the drain chambers 70, this fluid would be pulled into the hydrostatic pressure chambers 37, 38 thereby creating a pressure hampering the operation of element 24' as an "underpressure element". This is prevented to a large extent by the drain chamber 70 located on the side of element 24' opposite the direction of rotation of roll cylinder 1 as this chamber will catch the dragged fluid pressure and via the return valve 43 enable the fluid to drain with negligible resistance or pressure buildup. In the reverse case, i.e., during operation of the element 24' as an overpressure element the drain chambers 70 are closed by valves 43 and remain ineffective.

When element 24' functions as an underpressure element, the cylinder chamber 40 and its feed duct 26 are connected to drain while via line 66, the inner chamber 60 and the choke bore 39, a pressure is retained in the pressure chambers 37, 38 which is just great enough to overcome the force of spring 44 thereby providing the fluid film separating the edge 35 and the inner circumference 4 of the roll cylinder 1. Since this pressure is significantly less than the pressure in the gap, the function of the underpressure elements is not adversely affected thereby.

The circuitry diagram of FIG. 11 differs from that shown in FIG. 6 only in the addition of the separate pressure fluid connection via the line arrangement 66, 63. Additionally, a flow regulating valve 68 connected in feed ducts 66 is provided to regulate the quantity of the pressurized fluid added to the hydrostatic pressure chambers 37, 38. Connected to each element 24' or to each group of symmetrically located elements is a flow regulating valve 68 ensuring that each element 24' or each group of elements receives the exact quantity of pressurized fluid apportioned. Thus, pressure is automatically adjusted by flow regulating valves 68.

Figure 13:
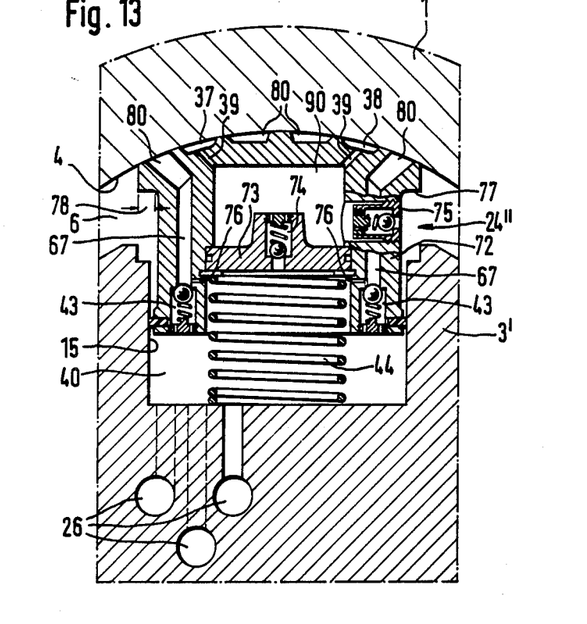
FIGS. 13, 14, and 15 are views corresponding to FIGS. 5, 6, and 7, respectively, of yet another embodiment of a sealing element.
Figure 14:
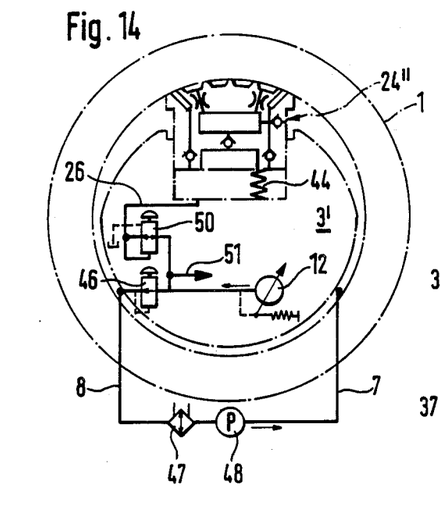
Figure 15:
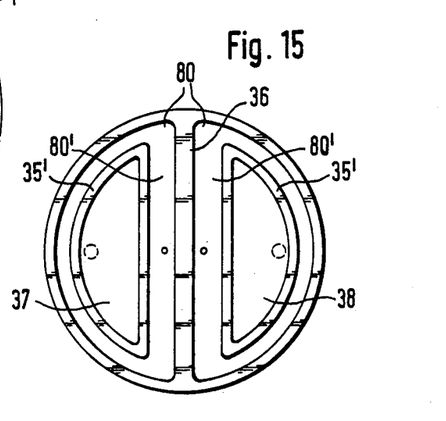

Element 24" shown in FIG. 13-15 represents another embodiment in which the separate addition of the pressurized fluid to the hydrostatic pressure chambers 37, 38 is not provided but the pressure in chambers 37, 38 adjusts as a function of the pressure within the cylinder space 40 itself. Correspondingly, no additional feed ducts (like 66 in FIGS. 10-12) in addition to lines 26 are required. In element 24" drain chambers 80 are provided through which fluid may flow via return valves 43 into cylinder space 40. The return valves 43 are located in channels 67. The drain channels 80 are also approximately semicircular and surround the perimeter of the hydrostatic pressure chambers 37, 38. Thus, in contrast to element 24', the ends of the semicircular drain channels 80 in the element 24" are connected to each other via channel parts 80' whereby each drain channel 80 forms a drainage zone completely surrounding the respective hydrostatic pressure chamber 37 or 38. Each of the hydrostatic pressure chambers 37, 38 are separated from its respective drain channel 80 by an edge 35' forming a sealing web surrounding the respective chamber. The hydrostatic pressure chambers 37, 38 form island-type regions within the drain channel 80.

Element 24" also is formed from a cup-shaped cast part 72, With is arranged with its open side downward in the pocket bore 15. However, an intermediate bottom 73 is arranged midway in stamp 24" forming an inner chamber 90 from which the choke bores 39 originate and bores 39 terminate in the hydrostatic pressure chambers 37, 38. In bottom 73 a return valve 74 permitting flow into the inner chamber 9 is arranged. In addition, in the side wall of part 72 in the vicinity of the inner chamber 90 a return valve 75 is provided permitting flow from the gap 6 into the inner chamber 90.

If element 24" is operated as an overpressure element the drain chambers 80 may be utilized as hydrostatic pressure chambers. In order to carry out this function choke bores 76 are provided in the channels 67 containing the return valves 43. Bores 76 connect the channels 67 with the cylinder space 40 in the intermediate region of channel 67 outside chamber 90 between the return valves 43 and the inner circumference 4.

During operation as an overpressure element, fluid underpressure is supplied to the cylinder space 40, which is higher than the pressure in the gap 6. The pressurized fluid flows via the return valve 74 into the inner chamber 90 and from there through the choke bores 39 into the hydrostatic chambers 37, 38. The return valve 75 remains closed thereby trapping the pressure in the inner chamber 90. In addition, the pressurized fluid from the cylinder space 40 flows via the choke bores 76 and the channels 67 into the drain chambers 80 which thereby also function as hydrostatic chambers.

The overall area of the hydrostatic chambers 37, 38 and the drain chambers 80 must be greater than the effective area of element 24" in the pocket bore 15 to ensure that support of element 24" on a thin fluid film formed between element 24" and the inner circumference 4 is established. Thus, the supporting area of element 24" bearing against the inner circumference 4 of cylinder 1 must be greater than the cross section of bore 15. Therefore, provided on the underside 77 of the head part of element 24", is an overhang 78, i.e., an annular area projecting radially inward upon which the pressurized fluid in the gap 6 acts to exert a force which biases element 24" against the inner circumference 4 of the roll cylinder 1.

The effect of this overhang must be accounted for if element 24" is operated as an underpressure element, i.e. if the pressure in the gap 6 is greater than the pressure in the cylinder space 40. In this case pressurized fluid which was introduced by rotation of the roll cylinder 1 from gap 6 into the drain chambers 80, is drained via the return valves 43 into the cylinder space 40. The high pressure in the gap 6 is effective to act upon the overhang 78 and press element 24″ with considerable force against the inner circumference 4 of the roll cylinder 1. This can lead to undesirable friction and contact eliminating the fluid film between the support face of element 24″ and the inner circumference 4. In order to prevent this effect, leading to undesirable metallic friction, the return valve 75 is provided. Through valve 75 pressurized fluid from the gap 6 enters the inner chamber 90 and is prevented by the return valve 74 from draining into the cylinder space 40. This fluid flows via the choke bores 39 into the hydrostatic pressure chambers 37, 38, thereby generating a force which opposes the force acting on the overhang 78. Element 24″ is in this manner hydraulically relieved when the areas of the overhang 78 and the hydraulic chambers 37 and 38 are appropriately adjusted to each other. This ensures overflow of fluid from the hydrostatic pressure chambers 37 and 38 to form at least partially a fluid film which prevents metal-metal contact even though element 24″ is operating in the underpressure mode.

Figure 16:
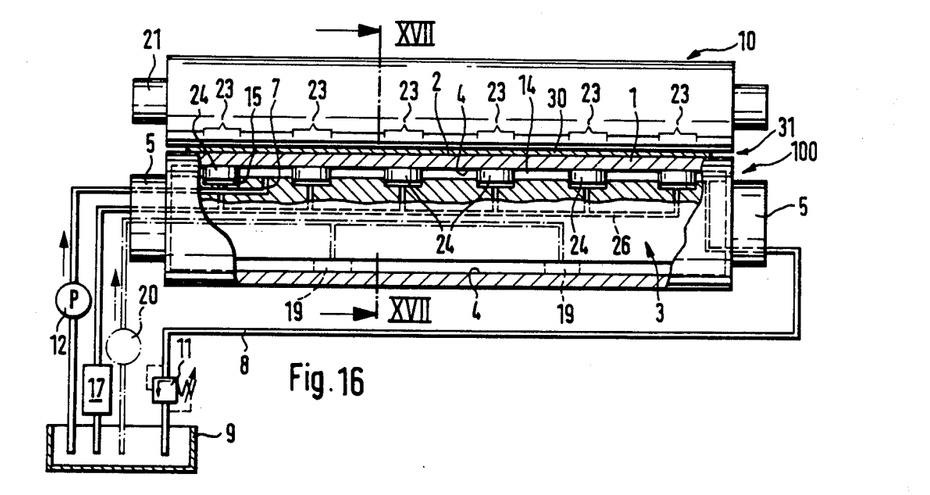
FIGS. 16–17 show another embodiment of a roll having the sealing element of the invention.
Figure 17:
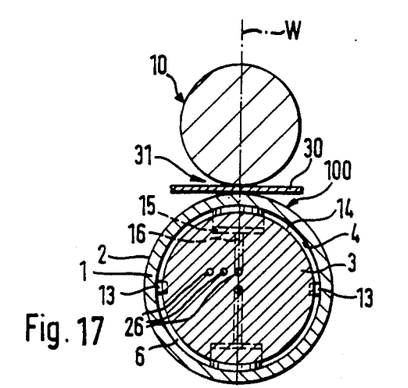

FIGS. 16–17 show another roll embodiment using pressure elements which create zones of increased or a decreased pressure force. The roll arrangement shown in FIGS. 16 and 17 comprises an upper roll 10 and a lower roll 100 between which a fabric web 30 is subjected to pressure treatment in the roll gap 31 formed there between. The upper roll 10 may be a conventional solid roll. The lower roll 100, on the other hand, comprises a rotating hollow roll or cylinder 1, the outer circumference 2 of which forms the working roll circumference. Extending through cylinder 1 is a stationary crosshead, which forms an annular clearance gap relative to the inner circumference 4 of roll cylinder 1. This enables bending of the crosshead 3 within the cylinder 1 without contact with the inner circumference 4. The pins 21 of the upper roll 10, as well as the crosshead ends 5 projecting from the ends of the roll cylinder 1, are supported in a roll stand and, if necessary, are pressed against each other by a suitable load device not shown.

The hollow roll 1 may be rotatably supported on the crosshead 3 at its ends by bearings (not shown). In an alternative embodiment, the cylinder 1 may be guided on the crosshead 3 in the effective plane W of the two rolls 10 and 100, as previously discussed. The hollow roll 1 can shift in this plane relative to the crosshead 3.

In the clearance gap 6 between the crosshead 3 and the inner circumference 4 of the roll cylinder 1 longitudinal seals 13 are provided extending along the crosshead 3 at diametrically opposed positions of the cylinder cross section thereby forming a longitudinal chamber 14 located on the same side as the roll gap 31. Chamber 14 is provided at its ends with transverse end seals and can be supplied with pressurized fluid, via an inlet line 7. The fluid may flow back into the return tank 9 via a line 8 in which a pressure limiting valve 11 is arranged which permits maintenance of a predetermined pressure in the longitudinal chamber 14. In this manner, a fluid flow results from left to right as shown in FIG. 16 in the longitudinal direction of the longitudinal chamber 14, which tends to stabilize the temperature of the roll cylinder 1, if the pressurized fluid serves simultaneously to affect the roll temperature.

In the longitudinal chamber 14 of the roll cylinder 1, Zones 23 are formed in which the pressure of longitudinal chamber 14 does not act. The longitudinal extent of the zones is indicated in small parentheses. In the embodiment of FIGS. 16 and 17 six such zones are present, however, this number may be changed dependent upon the operating conditions required.

Zones 23 are formed by the piston-like sealing elements 24, which are displaceably controlled in cylindrical pocket bores 15 at the upper side of crosshead 3. Elements 24 have front faces conforming to and bearing against the inner circumference 4 of the roll cylinder 1 to form sealed zones 23. Each of the pocket bores 15 is connected to one of several lines 26 (FIG. 17) having a valve or control device 17. In the region of elements 24 and thus in the zones 23 valves 17 enable a pressure to be maintained, which deviates from the pressure in the longitudinal chamber 14. This pressure can be controlled independently in the individual elements 24 or in groups of elements 24 depending on the number of feed lines 26 provided.

It is critical that elements 24 are constructed such that the pressure in their respective bores 15 can be higher or lower than the pressure in the longitudinal chamber 14 since the entire gap 6 is not pressurized. In the simplest case the control device 17 may connect elements 24 with the return tank 9 such that the bores of elements 24 are practically pressureless.

The pressure in the longitudinal chamber 14 would be uniform, but for zones 23 which are operable to modify the line pressure generated therein. Zones 23 may be controlled via elements 24 to be at higher or lower pressure than the uniform generated in chamber 14 as previously discussed. The line pressure distribution in the roll gap can be increased or decreased to achieve different effects.

In FIG. 16 two additional pressure elements 19 may be provided which are arranged at the underside of crosshead 3 and can exert a positive force against the underside of the inner circumference 4 of roll cylinder 1. They are supplied by a separate pump 20 with pressurized fluid or may be supplied with fluid derived from pump 12. Since the pressure elements 19 are additional elements which may facilitate the modification of the line pressure distribution, the pressure elements 19, feed lines, and pump 20 are represented in dot-dashed lines.

The elements 24 shown only schematically in FIG. 16 may function either as underpressure elements or overpressure elements. They may be employed in either roll arrangement 100 or roll 200 or other hydrauliocally supported rolls. Additionally, these elements may be constructed according to the elements described in FIGS. 5–15.

I claim:

1. A roll with controllable line pressure comprising a hollow roll forming a working roll circumference, a stationary crosshead extending through the hollow roll and forming therewith a clearance gap surrounding the hollow roll, transverse seals provided at both ends of the hollow roll sealing the clearance gap, means for establishing discrete isolated pressure zones within said clearance gap, means for supplying pressurized fluid at a predetermined pressure to the entire clearance gap except for said isolated pressure zones, said pressure zone establishing means including means for adjusting the pressure within the zones to a value less than the predetermined pressure in the clearance gap.

2. A roll according to claim 1 wherein said pressure adjusting means further includes means for adjusting the pressure within the zones to a value greater than the pressure in the clearance gap.

3. A roll according to claim 2 wherein said pressure zone establishing means comprises piston-like sealing elements displaceable in respective cylinder bores formed in the crosshead, the cylinder bore axes being arranged perpendicular to the longitudinal axis of the crosshead, said crosshead including at least one first inlet feed duct connected to the cylinder bores, each of said cylinder bores forming in conjunction with a respective sealing element a sealed cylinder space, each of said sealing elements having a supporting surface adapted to bear against the inner circumference of the hollow roll, each of said supporting surfaces comprises a pressure chamber surrounded by projecting edges of said supporting surface and which opens toward the inner circumference of the hollow roll, said sealing elements include a choke bore communicating with said pressure chamber and said sealing elements further include a first check valve arranged in a channel only permitting flow toward the cylinder space.

4. A roll according to claim 3 wherein said choke bore is connected to said cylinder space.

5. A roll according to claim 4 wherein each of said sealing elements has an inner chamber connected to said pressure chamber via said choke bore and to a second inlet duct via a fluid line separate from said first inlet duct, and wherein said fluid line guidably supports the sealing element for relative motion.

6. A roll according to claim 4 wherein each of said supporting surfaces includes a drain chamber positioned outwardly from the pressure chamber, said drain chamber being connected to the cylinder space via said first check valve only permitting flow toward the cylinder space.

7. A roll according to claim 3 wherein each of the sealing elements include an inner chamber connected via said choke bore to the pressure chamber and via a second check valve, only permitting flow toward the inner chamber, to the cylinder space, a third check valve connected between the clearance gap and the inner chamber only permitting flow towards the inner chamber, each of the sealing elements forming an overhanging portion having an area acted upon by fluid pressure in the clearance gap to force the sealing element against the inner circumference of the hollow roll and wherein the ratio of the effective area of the overhanging portion to the effective area of the pressure chamber provides pressure relief of the sealing element.

8. A roll according to claim 7 wherein the channel containing said first check valve is connected to the cylinder space outside the inner chamber via a second choke bore.

9. A roll according to claim 8 wherein the channel containing the first check valve is connected to a drain chamber surrounding the pressure chamber and separated therefrom by a web-like sealing edge.

10. A roll according to claim 3 wherein said sealing elements are arranged in a row provided on the side of the crosshead facing the roll gap.

11. A roll according to claim 10 wherein additional sealing elements are provided forming additional pressure zones of increased pressure relative to the pressure in the clearance gap.

12. In a roll with controllable line pressure comprising a hollow roll forming a working roll circumference, a stationary crosshead extending through the hollow roll and forming therewith a clearance gap surrounding the hollow roll, there being sealing elements are provided establishing discrete isolated pressure zones in the clearance gap to which first feed ducts are connected, wherein each of said sealing elements comprises a piston-like part displaceable in a cylinder bore formed in the crosshead in a direction perpendicular to the longitudinal axis of said crosshead, said part and bore forming a sealed cylinder space connected to at least one of said first feed ducts, said part having a supporting surface bearing against the inner circumference of the hollow roll, said supporting surface including a pressure chamber open toward the inner circumference and surrounded by projecting edges of said supporting surface, a choke bore connected to the pressure chamber supplying the pressure chamber with pressurized fluid, and a channel in which a first check valve is arranged only permitting flow toward the cylinder space.

13. Apparatus according to claim 12 wherein said choke bore is further connected to said cylinder space.

14. Apparatus according to claim 12 wherein said part has an inner chamber connected to said pressure chamber via said choke bore and to a second feed inlet duct via a fluid line separate from said at least one first feed duct, said fluid line guidably supports said part for relative motion.

15. Apparatus according to claim 12 wherein said supporting surface includes a drain chamber positioned outwardly from the pressure chamber, said drain chamber being connected to the cylinder space via said first check valve only permitting flow toward the cylinder space.

16. Apparatus according to claim 12 wherein said part includes an inner chamber connected via said choke bore to the pressure chamber and via a second check valve, only permitting flow toward the inner chamber, to the cylinder space, a third check valve connected between the clearance gap and the inner chamber only permitting flow towards the inner chamber, each of the sealing elements forming an overhanging portion having an area acted upon by fluid pressure in the clearance gap to force the sealing element against the inner circumference of the hollow roll and the ratio of the effective area of the overhanging portion to the effective area of the pressure chamber provides pressure relief of the sealing element.

17. Apparatus according to claim 16 wherein the channel containing said first check valve is connected to the cylinder space outside the inner chamber via a second choke bore.

18. Apparatus according to claim 17 wherein the channel containing the first check valve is connected to a drain chamber surrounding the pressure chamber and separated therefrom by a web-like sealing edge.

19. A roll with controllable line pressure comprising a hollow roll forming a working roll circumference, a stationary crosshead extending through the hollow roll and forming therewith a clearance gap surrounding the hollow roll, transverse seals provided at both ends of the hollow roll sealing the clearance gap, piston-like sealing elements establishing discrete isolate pressure zones within said clearance gap, a pump supplying pressurized fluid at a predetermined pressure to the entire clearance gap except for said isolated pressure zones, a control device connected to said discrete isolated pressure zones and to a return tank for adjusting the pressure within the zones to a value less than the predetermined pressure in the clearance gap.

20. A roll according to claim 19 wherein said control device includes a value optionally connected to a pump for pressurizing the zones to a value greater than the pressure in the clearance gap or to said return tank.

* * * * *

UNITED STATES PATENT AND TRADEMARK OFFICE
CERTIFICATE OF CORRECTION

PATENT NO. : 4,856,157

DATED : August 15, 1989

INVENTOR(S) : Karl-Heinz Küsters

It is certified that error appears in the above-identified patent and that said Letters Patent is hereby corrected as shown below:

In Column 1, line 9, change "...DE-PNo. 30 03 395." to read --...DE-OS 30 03 395.--

Column 1, line 13, change "...between crosshead..." to read --...between the crosshead...--

Column 1, line 38, change "In DE-No. 30 03 395..." to read --In DE-OS 30 03 395...--

Column 2, line 44, change "...pressure element With..." to read --...pressure element with...--

Column 2, line 61, change "...DEP No.30 03 395..." to read --...DE-OS 30 03 395...--

Column 4, line 40, change "...against the Weight..." to read --...against the weight...--

Column 7, line 37, change "...pressure in presented..." to read --...pressure is presented...--

Column 7, line 58, change "...FIG. 5 to 15." to read --...FIGS. 5 to 15.--

UNITED STATES PATENT AND TRADEMARK OFFICE
CERTIFICATE OF CORRECTION

PATENT NO. : 4,856,157

DATED : August 15, 1989

INVENTOR(S) : Karl-Heinz Küsters

It is certified that error appears in the above-identified patent and that said Letters Patent is hereby corrected as shown below:

In Column 9, line 46, change "...to an appreciable valve..." to read --...to an appreciable value...--

Column 10, line 39, change "...3', stationary crosshead" to read --...stationary crosshead 3',...-- line 53, "...longitudinally..." to read --...longitudinal...--

Column 12, line 19, change "...part 72, With ..." to read --...part 72, which ...--

Column 13, line 67, change "Zones 23..." to read --zones 23...--

Column 14, line 30, change "...uniform generated..." to read --...uniform pressure generated...--

Column 14, line 47, change "...hydraulioally..." to read --...hydraulically...--

Column 15, line 66, delete "are" after "elements".

UNITED STATES PATENT AND TRADEMARK OFFICE
CERTIFICATE OF CORRECTION

PATENT NO.   :  4,856,157

DATED        :  August 15, 1989

INVENTOR(S)  :  Karl-Heinz Küsters

It is certified that error appears in the above-identified patent and that said Letters Patent is hereby corrected as shown below:

In Column 16, line 18, claim 14, change "...second feed inlet duct ..." to read --...second feed duct,...-- line 56, claim 19, change "...isolate pressure..." to read --...isolated pressure...-- line 65, claim 20, change "...value optionally..." to read --...valve optionally...--

Signed and Sealed this

Eighth Day of January, 1991

Attest:

HARRY F. MANBECK, JR.

*Attesting Officer*      *Commissioner of Patents and Trademarks*